No. 830,644. PATENTED SEPT. 11, 1906.
F. E. DAVIS.
GRAIN DRILL.
APPLICATION FILED FEB. 5, 1904.
2 SHEETS—SHEET 2.
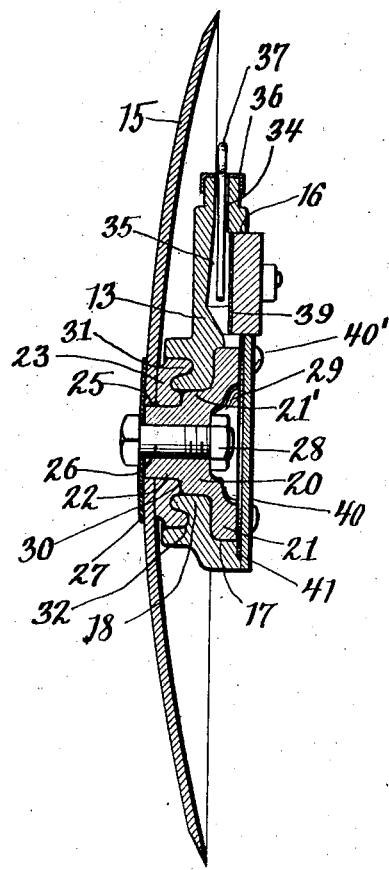
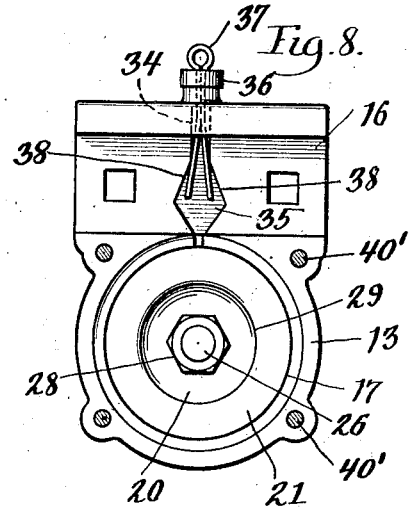
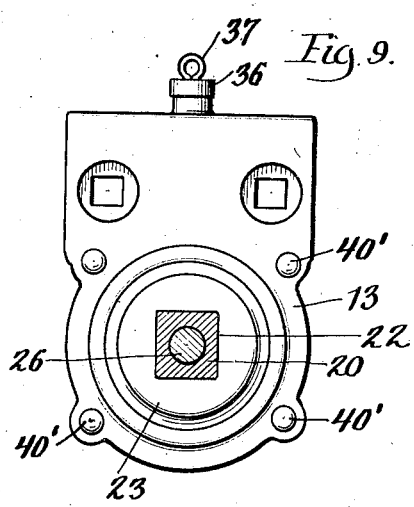
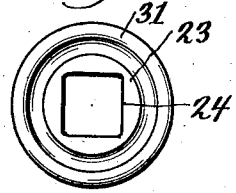
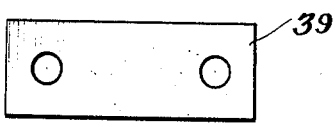
Witnesses:
Lillian Prentice
Alberta Adamick
Inventor:
Frank E. Davis.
By Fred Gerlach
his Attorney.

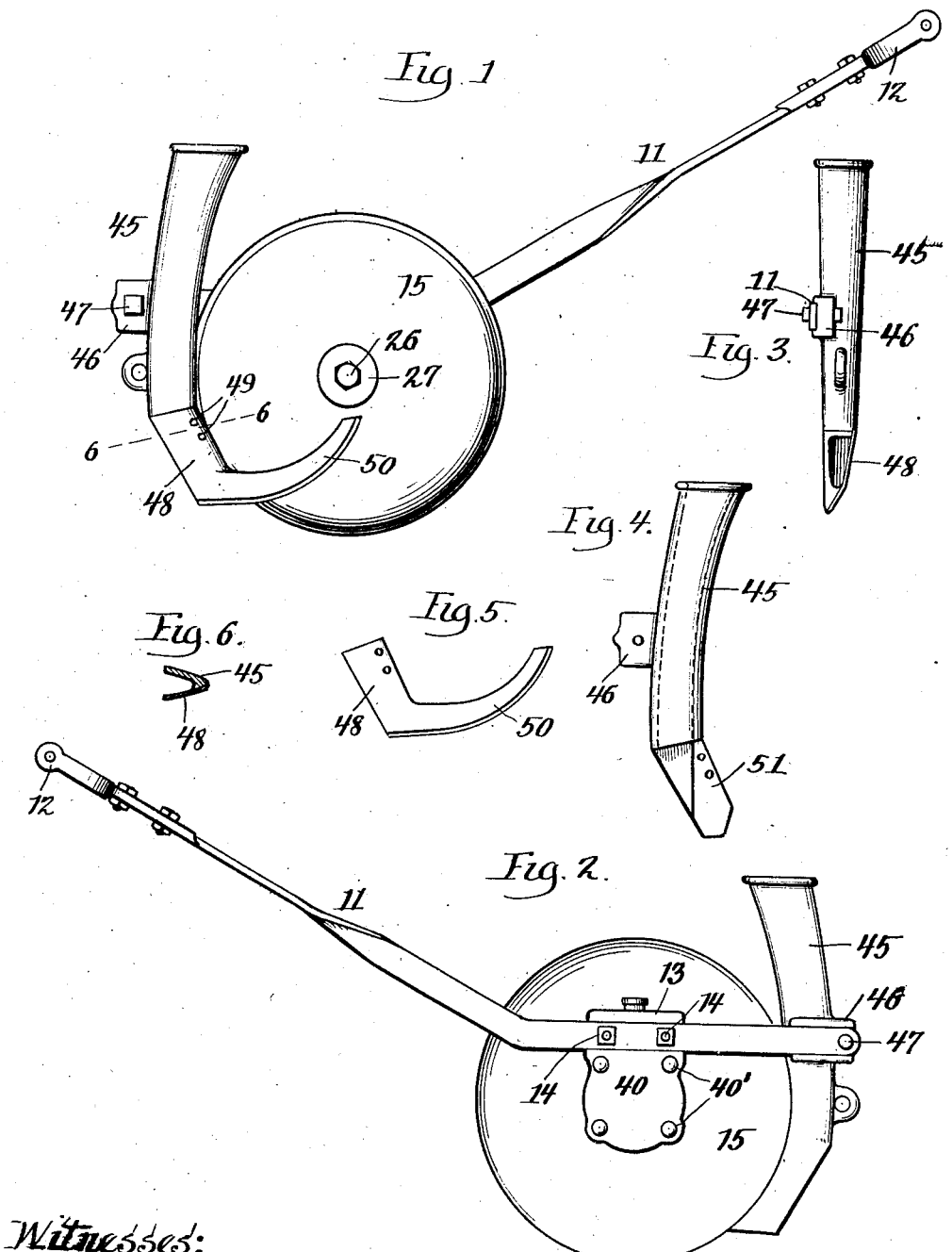

UNITED STATES PATENT OFFICE.

FRANK E. DAVIS, OF LA CROSSE, WISCONSIN.

GRAIN-DRILL.

No. 830,644.          Specification of Letters Patent.          Patented Sept. 11, 1906.

Application filed February 5, 1904. Serial No. 192,133.

*To all whom it may concern:*

Be it known that I, FRANK E. DAVIS, a resident of the city of La Crosse, in the county of La Crosse and State of Wisconsin, have invented certain new and useful Improvements in Grain-Drills, of which the following is a full, clear, and exact description.

The invention relates to seeding-machines, and more particularly to the furrow-openers and seed-delivering means thereof.

The invention designs to provide an improved disk drill in which the seed conduit or boot is provided with deflecting means, such as a blade, which effectively prevents the soil from adhering thereto and prevents accumulation of soil and trash between the disk and boot, so progress of the machine and rotation of the disk will not be retarded; to provide an improved grain-drill of compact construction, so the clearance-spaces between the disks of a gang are wider than heretofore without increasing the distance between the disks, and, furthermore, so the disks of a gang can be arranged to open furrows in closer proximity to each other, still leaving sufficient clearance-spaces between the disks to avoid accumulation of trash therebetween; to provide an improved construction of journal or bearing for sustaining a revoluble disk, which effectively excludes dirt from the bearing-surfaces and retains the lubricant and which consists of elements which can be readily assembled and produced at a low cost, and to provide an improved and simple construction, whereby the disk-hanger is secured at one side of the disk and the seed-conduit at the other side thereof.

With these objects in view the invention consists in the several novel features of construction hereinafter set forth, and more particularly defined by claim at the conclusion hereof.

In the drawings, Figure 1 is a side elevation of a grain-drill embodying the preferred form of the invention. Fig. 2 is a similar view of the other side. Fig. 3 is a rear elevation of the seed-conduit. Fig. 4 is a detail of the seed-conduit, the scouring-plate being removed. Fig. 5 is a detail view of the combined scraper and scouring-plate. Fig. 6 is a section of the seed-conduit, taken on line 6 6 of Fig. 1. Fig. 7 is a central vertical section of the disk journal and bearing. Fig. 8 is a detail view of one side of the bearing-bracket, the cover-plate being removed. Fig. 9 is a similar view of the other side of said bracket, the projecting end of the journal-stud being shown in section. Fig. 10 is a detail view of the spacing-collar on the journal-stud. Fig. 11 is a detail view of the packing-sheet interposed between the bearing-bracket and drag-bar to prevent escape of lubricant from the recess in said bracket.

A drag-bar or beam 11 is provided at its front end with a pivot-bracket 12, whereby the beam can be attached to the frame of a seeding-machine. A bearing-bracket 13 is rigidly secured to beam 11 by bolts or rivets 14 and forms the bearing or support in which a concavo-convex disk 15 is journaled. Hanger 13 is recessed, as at 16, to form a seat for the drag-bar. The lower portion of the hanger is formed with a bearing-surface or recess 17 and an annular inwardly-extending rib or wall 18, which fits between a collar and a stud of the journal of the disk to retain the disk against lateral and vertical play. The journal for the disk comprises a stud 20, having an enlarged portion or flange 21, fitting in recess 17 of hanger 13 and having a cylindrical central portion 21', extended through and fitting in the opening within rib 18, and a polygonal or non-circular end portion 22, which extends through a correspondingly-shaped opening 24 in a spacing-collar 23 and a similar opening 25 in disk 15. The polygonal end of stud fitting in said openings in the collar and disk secures the stud and collar to revolve with the disk. A tie-bolt 26 extends centrally through the stud and disk and clamps these parts together. Preferably a washer 27 is interposed between the head of bolt 26 and the convex face of the disk, and a lock-nut 28 at the inner end of said bolt lies within a pocket or recess 29 in stud 20. Collar 23 is clamped between the concave face of the disk and a shoulder 30 of stud 20, which also fixes the relation of collar, so the bearing-surfaces of the collar and stud will be free to revolve in the bearing. Collar 23 fits within that portion of the bearing adjacent the concave face of the disk and is formed with a rib 31, fitting into a groove 32 in bearing 13, and this construction effectively excludes dust from the bearing-surfaces, because the dust cannot pass along the sinuous surfaces.

Bearing-bracket 13 has formed therein a duct 34 for lubricant, and preferably comprises a chamber or recess 35, formed in that side of the hanger which lies adjacent the drag-bar and conducts the lubricant to bearing-surface 17 and to the journal-stud. The upper end of duct 34 is closed by a cap 36, held in place by a cotter-pin 37, which extends through the cap and has its legs spread to engage inclined walls 38 of recess 35 and frictionally secure the cap in closed position. The upper portion of the duct-walls are parallel, so the cotter-pin will also frictionally hold the cap in open position while the lubricant is being fed into the recess. A strip of packing 39, such as oil-paper, is interposed between the drag-bar and the side of hanger 13 to prevent escape of the lubricant. A plate 40, secured to hanger 13 by rivets or bolts 40', forms a closure, which prevents entry of dust at one side of the bearing. A strip of packing or gasket 41 between plate 39 and bearing 13 prevents escape of oil from the bearing, so the lubricant will be retained in the bearing.

A seed-delivery conduit or boot 45 is sustained adjacent the rear of the disk and at the convex side thereof by a recessed lug 46, integrally formed with the boot and secured to the rear end of the drag-bar by a bolt 47. As well understood in the art, the disk is set at an angle with respect to the line of draft to open a furrow of the desired depth and width. The lower terminal of the boot is positioned to deliver seed into the lowest part or center of the furrow. A blade, preferably of polished steel, comprises an extension 48, secured to the boot by rivets 49, and a scraper 50, having its lower edge sharpened and bent into contact with the convex face of the disk. Extension 48 forms the outer wall of that portion of the boot which travels in the furrow and against which the loose soil falls and being formed of polished steel easily passes through the furrow and soil and deflects the soil away from the boot. In other words, the extension constitutes a scouring-blade, which effectively prevents the soil from adhering to the boot. Scraper 50 removes the soil from the convex side of the disk. The lower portion or wall of the boot has its outer side cut away, as at 51, or openly formed, and blade 48 forms the outer side of said portion of the boot, which construction provides a boot the lower end whereof scours in the soil and is made narrow so it will travel nicely in the furrow. The lower portion of the seed-conduit, which is formed by the boot and blade 48, is tapered, (see Fig. 3,) so it will easily travel in the furrow, and rivets 49 are preferably located some distance above the boot-terminal to avoid extending the rivets through the thinnest portion of the boot.

The invention possesses several important advantages over prior constructions. The scouring-blade at the foot of the boot effectively prevents the soil from adhering to the boot. The scraper for the convex side of the disk and the scouring-blade being formed of a single plate or strip of metal can be cheaply produced. The compact construction and the arrangement of the bearing-disk and sustaining-bar, hereinbefore set forth, leave increased clearance-spaces between the disks of a gang and avoid accumulation of trash between drills of a gang. Furthermore, these wide clearance-spaces make it possible in practice to set the disks in close relation, to open furrows in closer proximity than has heretofore been customary and still avoid such accumulation, which resultant advantage is an important one, because in some sections of the country closer arrangement of plant rows is desired which was not possible in constructions in which there was less clearance between the disk and disk-support of one furrow-opener and the next in the gang.

The improved construction of disk-bearing is such that dust is excluded from the bearing-surfaces and the lubricant is retained in the bearing. The construction of the bearing, with its ribbed spacing-collar and correspondingly-shaped recess of the bracket, make it possible to position the disk into close proximity to the bearing and sustaining bar. By employing a drag-bar, which extends to the rear of the disk and is there secured to the boot, and a separate bearing-bracket for the disk an improved and simple construction is provided, in which the bearing is located on the concave face and the boot on the convex face of the disk, which arrangement in practice is preferred, because the bearing is kept clear of loose soil. An advantage of employing an open oil-recess in the side of the bracket is that a recess of the desired shape can be cast in the bracket.

The several features of the invention are not to be understood as restricted to the precise details set forth, because these may be varied by the skilled mechanic without departing from the spirit of the invention.

Having thus described the invention, what I claim as new, and desire to secure by Letters Patent, is—

1. In a grain-drill, the combination of a drag-bar, a disk, a boot having a channel therein extended to deliver the seed into the furrow, and a scouring-blade secured to the boot and extending upwardly from the toe of the boot on the outer side thereof.

2. In a grain-drill, the combination of a drag-bar, a disk, a boot having a channel therein extended to conduct seed into the furrow, and a blade secured to the boot, and comprising a strip extending upwardly from the toe of the boot on the outer side thereof and a scraper extending upwardly and forwardly from the toe.

3. In a grain-drill, the combination of, a drag-bar, a disk, a boot having a channel therein extended to deliver seed into the furrow, and having a wall at the side adjacent the disk and the lower portion of its outer side open, and a scouring-blade extending upwardly from the toe of the boot and on the outer side of said opening.

4. In a grain-drill, the combination of, a drag-bar, a disk, a boot having a channel therein extended to deliver seed into the furrow, and having an inclosing wall at the side of the disk and the lower portion of its outer side open, and a blade comprising a strip extending upwardly from the toe of the boot and on the outer side thereof, and a scraper-strip extending upwardly and forwardly from the boot.

5. In a grain-drill, the combination of a disk, a bracket in which the disk is journaled, a single drag-bar to which said bracket is secured, and arranged at one side of the disk, and a seed-boot at the other side of the disk, said bar having an integral portion extending rearwardly of the bracket, and to which the boot is secured.

6. In a grain-drill, the combination of a concavo-convex disk, a bracket in which the disk is journaled, a single drag-bar to which said bracket is secured, and arranged at the concave side of the disk, and a seed-boot at the convex side of the disk, said bar having an integral portion extending rearwardly of the bracket, and to which the boot is secured.

7. In a grain-drill, the combination of a concavo-convex disk, a bracket in which the disk is journaled, a single drag-bar to which said bracket is secured, and arranged at the concave side of the disk, a seed-boot at the convex side of the disk, said bar having a portion extending rearwardly of the bracket and to which the boot is secured, and a scouring-blade secured to the outer side of the boot and having a forwardly and upwardly extending scraper-strip.

8. In a grain-drill, the combination of a drag-bar, a disk and a bearing for said disk comprising a bracket having a wall with a central opening therein and a recess at each side of said wall, a stud having a flange fitting in one of said recesses and extending through said opening and having a reduced portion, and a collar around said reduced portion and lying in the other recess, said stud being secured to revolve with the disk and having a shoulder, said collar fitting between said shoulder and the disk.

9. In a grain-drill, the combination of a drag-bar, a disk, and a bearing comprising a bracket secured to the drag-bar, a stud journaled in said bracket and having a non-circular portion extending into a central opening in the disk and a collar adjacent the disk and fitting around said portion, said collar having an annular rib fitting into a corresponding groove in the bracket.

10. In a grain-drill, the combination of a drag-bar, a disk, and a bearing comprising a bracket secured to the drag-bar, a stud journaled in said bracket and having a non-circular portion, extending into a central opening in the disk, a collar adjacent the disk and fitting around said portion, said collar having an annular rib fitting into a corresponding groove in the bracket, and a tie-bolt securing the stud, collar and disk together.

11. In a grain-drill, the combination of a drag-bar, a disk, and a bearing comprising a bracket and having a recess at each end and a wall having an opening therein, a stud having a flange fitting into one of said recesses and its central portion fitting in said opening and having a non-circular end and a shoulder, and a collar held between said shoulder and the disk and having an annular rib lying in a groove in said wall.

12. In a grain-drill the combination of a drag-bar, a disk, a bearing-bracket secured to the drag-bar and having a recess at each end, and a wall having a central opening therein, a stud having a flange fitting into one of said recesses and its central portion extending through said opening and having a shoulder thereon, a collar held between said shoulder and the disk and having an annular rib fitting in a groove in said wall, said collar having an annular groove into which a portion of said wall is extended.

13. In a drill, the combination of a drag-bar, a disk, and a bearing comprising a bracket, a stud journaled in said bracket and secured to revolve with the disk, a plate secured to the bracket and closing the bearing-recess at one side of the bracket and a packing between the plate and the bracket.

14. In a grain-drill the combination of, a drag-bar, a disk, a bearing-bracket adjacent the concave side of said disk and having a central opening therein, an enlarged recess at each end thereof, a stud extending through said opening having a flange fitting in one of said recesses and secured to revolve with the disk, a collar secured to revolve with the stud and fitting in the recess adjacent the disk, and a plate secured to the bracket and closing the opening at one end of the bracket.

15. In a grain-drill the combination of, a drag-bar, disk, a bearing-bracket adjacent the concave side of the disk having a central opening therein and an enlarged recess at each end thereof, a stud having a flange fitting in one of said recesses and secured to the disk, a shoulder on said stud a collar secured to revolve with the stud and adjacent the concave side of the disk and fitting into the other recess and having an annular rib fitting into a corresponding groove in the bracket, and a plate secured to the bracket and closing the bearing-recess at one side of the bracket.

16. In a grain-drill, the combination of a drag-bar, a disk, and a bearing comprising a bracket secured to the drag-bar, a stud journaled in said bracket, an oil-duct formed in the bracket and having an enlarged portion formed in the bracket and leading to the bearing-surface therein, a closure for the oil-duct and a cotter-pin extending into said duct and impinging against the wall of said duct to frictionally secure the closure.

17. In a grain-drill, the combination of a drag-bar, a disk, a bearing-bracket secured to the drag-bar, a stud secured to revolve with said disk and journaled in said bracket, an oil-duct in the side of that portion of the bracket which lies adjacent the drag-bar, and a packing between the drag-bar and the bracket.

18. In a grain-drill, the combination of a drag-bar, a disk, a bearing-bracket secured to the drag-bar, a stud secured to revolve with the disk and journaled in said bracket, an oil-duct in the side of that portion of the bracket which lies adjacent the drag-bar, said drag-bar being secured to the bracket at the side thereof, and to extend across the open side of the oil-duct.

FRANK E. DAVIS.

Witnesses:
C. W. DICKINSON,
W. P. ROELLIG.